United States Patent
Kumar et al.

(10) Patent No.: US 12,095,767 B1
(45) Date of Patent: Sep. 17, 2024

(54) NETWORK DEVICE ACCESS CONTROL AND SYNCHRONIZATION

(71) Applicant: Amazon Technologies, Inc., Seattle, WA (US)

(72) Inventors: Surendra Kumar, San Ramon, CA (US); John Brett, Yarrawarrah (AU); Swati Bansal, Forestville (AU); Asela Jude Mallawaaratchy, Campsie (AU); Joshua Page Starkweather, North Sydney (AU)

(73) Assignee: Amazon Technologies, Inc., Seattle, WA (US)

(*) Notice: Subject to any disclaimer, the term of this patent is extended or adjusted under 35 U.S.C. 154(b) by 10 days.

(21) Appl. No.: 17/491,377

(22) Filed: Sep. 30, 2021

(51) Int. Cl.
  *H04L 29/06* (2006.01)
  *G06F 9/54* (2006.01)
  *H04L 1/00* (2006.01)
  *H04L 9/40* (2022.01)

(52) U.S. Cl.
  CPC .............. *H04L 63/10* (2013.01); *G06F 9/547* (2013.01); *H04L 1/0071* (2013.01); *H04L 63/20* (2013.01)

(58) Field of Classification Search
  CPC ....... H04L 63/20; H04L 63/10; H04L 63/105; H04L 63/108; H04L 63/126; H04W 12/08
  USPC ............................................................ 726/1
  See application file for complete search history.

(56) References Cited

U.S. PATENT DOCUMENTS

| | | | |
|---|---|---|---|
| 8,254,886 B2 * | 8/2012 | Salkini ................ | H04W 12/082 455/411 |
| 10,979,896 B2 * | 4/2021 | Chakra ................. | H04W 12/06 |

* cited by examiner

*Primary Examiner* — Longbit Chai
(74) *Attorney, Agent, or Firm* — Klarquist Sparkman, LLP

(57) ABSTRACT

In a network environment, access to network devices is controlled using a multi-leveled locking mechanism. A method of applying the locking mechanism may include managing device locks configured to control access of a plurality of tools to a memory of a network device, where the device locks include a first level of device lock associated with a first priority and a second level of device lock associated with a second priority that is higher than the first priority. The method may further include generating an interleaved signal responsive to issuing the second level of device lock to a second tool while a first tool has an active first level of device lock. The interleaved signal may be communicated to the first tool and the first tool may coordinate subsequent changes to the network device in accordance with changes to the network device that are made by the second tool after the interleaved signal is generated.

20 Claims, 9 Drawing Sheets

NETWORK DEVICE ACCESS CONTROL AND SYNCHRONIZATION

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Cloud computing and other networks include a large number of network devices and other components that may be managed by multiple tools and services. For example, tools may make changes to network infrastructure for operational considerations or routine maintenance. In some instances, more than one tool may simultaneously affect or attempt to affect the same device in the network, which can lead to undesirable network events that impact network performance (e.g., increasing delays, increasing packet loss, etc.).

DETAILED DESCRIPTION

Figure 1:
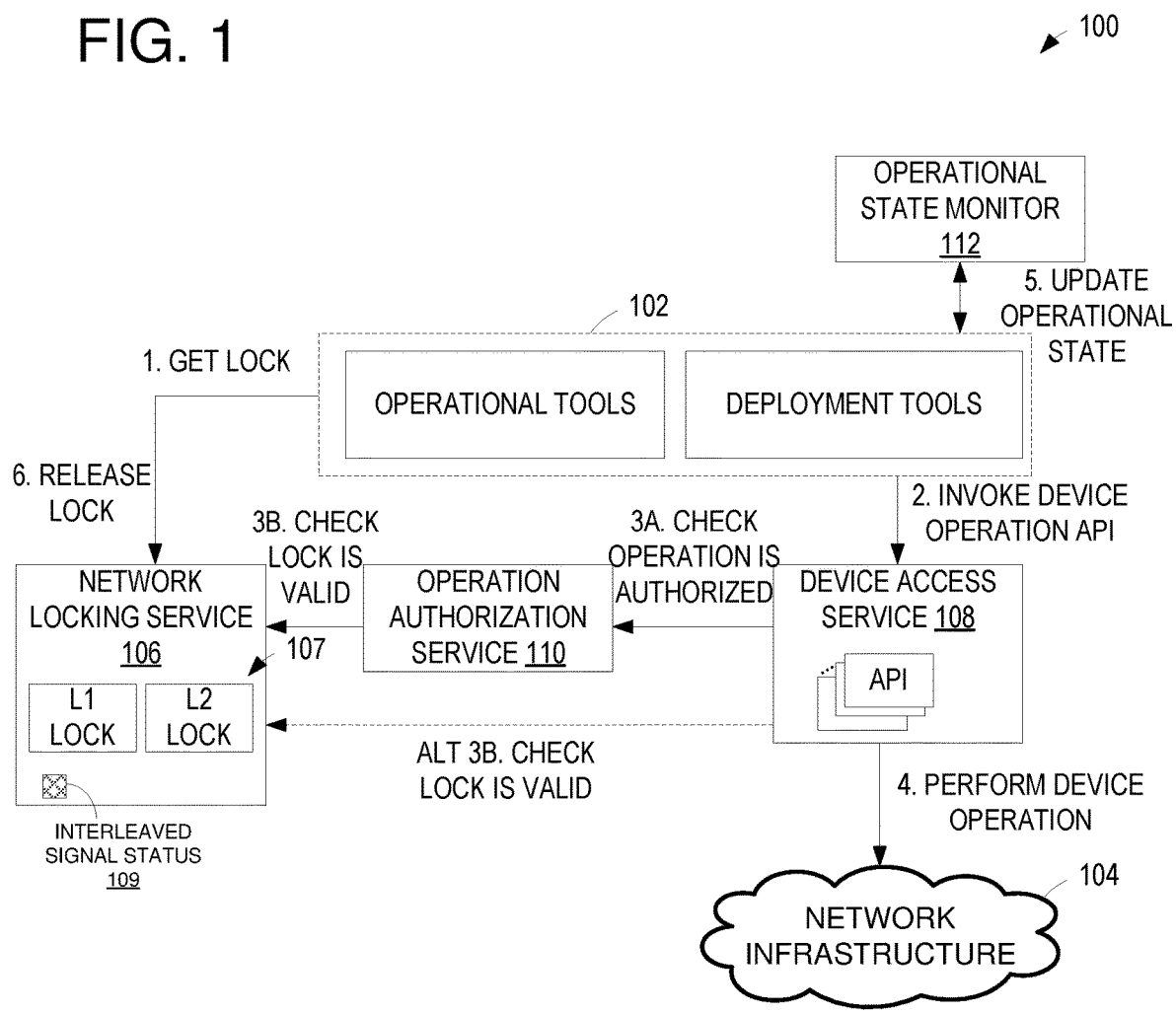
FIG. 1 is a block diagram of an example architecture for operating a dual lock service for performing device operations in a network.

Networks may utilize one or more deployment tools to continuously update device configuration and software (e.g., operating system [OS], boot-loader, automation scripts, etc.) to keep the devices in sync with latest released versions of the configurations and software. Additionally, there are many other tools that change a configuration state of a network device directly on the device. For example, a first tool may change routing cost to shift traffic away from and back to a connection for operational purposes, a second tool may update device credentials periodically, a third tool may program link encryption keys for the device, a fourth tool may provision Access Control Lists (ACLs) to ensure security posture, a fifth tool may provision customers at periodic intervals, a sixth tool may update device configuration to maintain alternate routes, a seventh tool may update configurations of devices for scaling or operational considerations, and/or an eighth tool may perform targeted configuration changes to remediate problems in the device/network. The above-referenced tools are illustrative examples, and networks implementing the technologies described herein may include more, fewer, and/or different combinations of tools to adjust configurations and/or operations of the network/network devices.

Many existing tools used to update or alter network devices do not comply to existing locking rules. For example, some tools, such as remediation tools, are time sensitive and operate on devices as quickly as possible to mitigate network events. Such tools may thereby soft-fail when a device lock cannot be acquired, and continue to make the changes despite the lack of acquisition of the device lock. Other tools, such as automation tools, may not be time sensitive, but may operate best when uninterrupted to maintain change velocity. In practice, this conflict of tool behaviors and needs may lead to configurations applied by one tool being overwritten by another, which may cause tool failures and/or networking events (e.g., link downs, interface hardware issues, packet loss, increased latencies, etc.). The locking constructs often used today do not allow tools to co-ordinate to prevent interrupting one another. Such systems also lack locking semantics to support common use cases: multiple tools working within the same critical section, changing order of tool invocations, etc. As it stands, existing locking systems are based on an "honor-code" and do not offer mechanisms to ensure tools that do not "play by the rules" and that risk safety of the network infrastructure, are stopped.

The disclosure provides locking systems, methods, and related technologies for addressing the above issues. In addition to other considerations, the disclosed technologies provide the ability to allow nested workflows involving multiple tools to co-ordinate with ownership tracing, accommodate operational tooling needs to remediate events (e.g., enabling network operations tools to perform time-sensitive functions during operational incidents), and to prevent tools that are not following locking principals from writing to a network device.

FIG. 1 shows an example of an architecture 100 that may be used to implement the disclosed locking mechanisms. The components of FIG. 1, such as the tools 102, network locking service 106, device access service 108, operation authorization service 110, and operational state monitor 112, may include one or more computing systems (e.g., a computing environment, described in more detail below with respect to FIG. 9) executing instructions (e.g., software) to perform associated operations, described in more detail below. In some examples, one or more of the components of FIG. 1 may be implemented via a cloud computing service (described in more detail below with respect to FIGS. 6-8). In some examples, the locking mechanisms described herein may be used to control the ability of one or more tools 102 to perform device operations (e.g., read/write actions) on network devices (e.g., routers, switches, or other network devices) in a network infrastructure 104. In examples of the present disclosure, networking tools and services are sorted into different categories, each of which is associated with a respective level of lock. For illustrative purposes, the disclosure primarily describes bi-level locks, such as a level 1 (L1) write-lock and a level 2 (L2) write-lock, for networking tools and services that fall into the categories of normal-priority automation tools (e.g., deployment tools) and high-priority automation tools (e.g., operational tools), respectively. It is to be understood that similar approaches may be used with additional levels of locks associated with corresponding categories of tools and services. Examples of tools that may be used for performing device operations are described in more detail below and may include tools to update, upgrade, and/or maintain a network device.

In the described examples, any tool wishing to write to a device holds a write lock. It is to be understood that the examples described herein with respect to write locks may be similarly applied to read locks or other types of device access locks (e.g., locks to control access to a memory/storage of the device). Accordingly, at operation 1 in the example of FIG. 1, a selected tool 102 acquires a lock from a network locking service 106. As shown, the network locking service 106 manages multiple levels of locks 107 (e.g., an L1 lock and an L2 lock in the illustrated example). The purpose of L1 locks may include mutual-exclusion among normal priority automation tools and the purpose of L2 locks may include mutual-exclusion between operational and automation tooling and/or mutual-exclusion across levels. L1 locks may prevent normal priority tools from writing to the same device simultaneously, however, may allow a high priority tool to interleave its commands with those of a normal/low priority tool (provided the high priority tool owns an L2 lock). For example, the high priority tool, upon acquiring the L2 lock, may initiate and perform device operations while the normal/low priority tool holds the L1 lock (e.g., preventing the normal/low priority tool from performing device operations in some examples until the L2 lock is released). In response to such an interleaving, an interleaved (or "dirty") signal status 109 may be toggled to mark the L1 lock as interleaved/dirty until such time that the interleaved/dirty signal is cleared (as described in more detail below). In some examples, the interleaved signal status 109 may be queried by the tools 102, and in other examples, the network locking service 106 may actively notify a tool holding an L1 lock of a change in interleaved signal status. L2 locks may prevent all tools except a corresponding L2 lock owner from writing to the device. Tools may, as a rule, only acquire locks in an increasing order (e.g., an L1 lock followed by an L2 lock). In some examples, there may be no restrictions on automation tools and the type of lock they can obtain, other than restrictions that are based on corresponding workflows and an effect of performing interleaved device operations during the workflows (e.g., due to the routing and forwarding state of the device and/or other factors). Any workflow intending to transition a device between operational and maintenance states may hold an L2 lock to prevent being interrupted. In an example case of traffic shifting, the traffic shifting tool may acquire an L2 lock just before increasing the routing cost to shift the traffic away, or the tool may hold the L2 lock while decreasing the routing cost to shift the traffic back.

At operation 2 in FIG. 1, the selected tool 102 invokes a device operation API using device access service 108. The device access service 108 validates the access, which includes checking that the requested device operation is authorized with an operation authorization service 110 (shown at 3a). The access validation may also include a second check, which includes checking that the lock is valid using the network locking service 106. The lock validation check may be performed by way of the operation authorization service 110 (shown at 3b) or via a direct check between the device access service 108 and the network locking service 106 (shown at Alt 3b). In order to ensure that tools conform to the disclosed locking scheme, the tools are allowed to write to a device only if they are the owners of the lock (e.g., the writing tool must be the creator owner or a temporary owner executing under creator's context, as in sub workflows). A lock state (e.g., governed by the network locking service 106) may track ownership transfers along with other attributes. The locking system uses the device access service 108 to enforce safety. For example, the device access service 108 provides a secure interface to network devices while ensuring safety of accesses performed through that interface. Although the device access service 108 performs the safety assertion, the actual lock validation is abstracted away in the locking system, similar to operation-authorization abstracted away in the operation authorization service 110, described in more detail below. The device access service 108 thus participates neither in policy control nor policy decision but only policy enforcement in some examples. This reduces the complexity of the device access service 108, by acting on Boolean—permit/deny policy decisions, and allowing safety and security to be fully abstracted away and owned by other systems, such as the operation authorization service 110 and the network locking service 106.

If the checks performed at 3a/3b/Alt 3b are successful, indicating that the requested device operation and associated lock are authorized/valid, the device access service 108 utilizes the invoked API to perform the device operation on a device of the network infrastructure 104, as shown at operation 4. In some examples, the device access service 108 stores records or identifiers of operations performed during the locked state (e.g., where indications of lock acquisitions and lock releases are stored as boundaries for the operations). In such examples, the records may be used to revert the device back to a prior state and/or repeat operations (e.g., without the original tool instigating such repeat operations).

An update regarding the operational state of the targeted device is provided to an operational state monitor 112, as shown at operation 5. For example, it is helpful for tools making device configuration changes to also reflect that in the authoritative operational state. This enables rendering and reporting of correct operational state in the configuration requested by deployment tools. The reporting of the operational state allows deployment tools to apply the latest operational state, as part of a device configuration update. Once a workflow is completed (e.g., the device operation is performed), the lock is released, as shown at operation 6.

Figure 2:
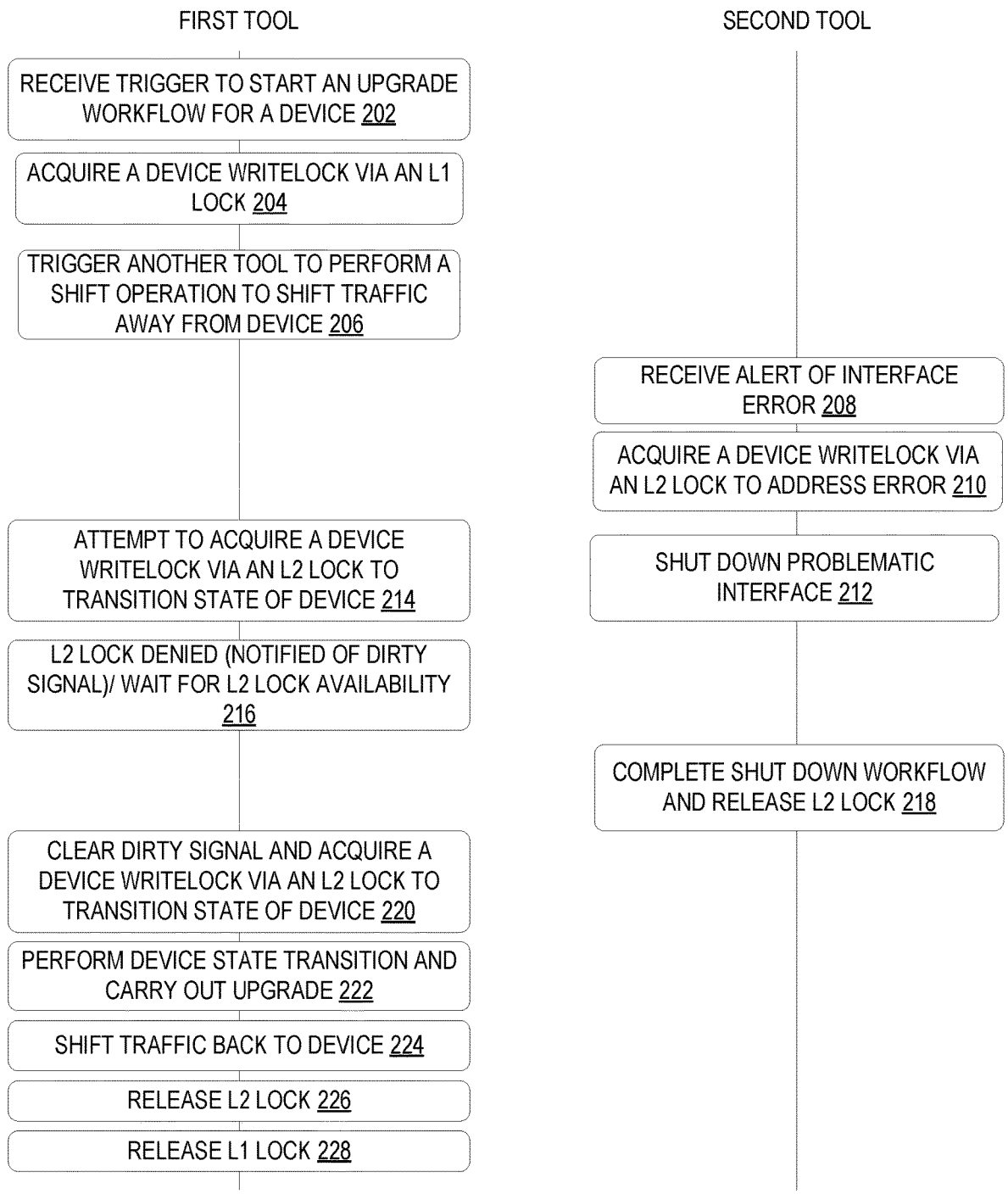
FIG. 2 is a flow chart of an example method of performing operations on a network device using a first tool and a second tool in accordance with a bi-level locking mechanism.

An example implementation scenario is represented by the flow diagram 200 of FIG. 2. The example device operations and workflows described in FIG. 2 are provided for illustrative purposes. In other example implementations of the technologies, other operations/workflows may be performed using the disclosed technologies in an analogous manner. In the illustrated implementation scenario, a first tool receives a trigger to start an upgrade workflow for a device, as indicated at 202. The first tool kicks off its workflow with an L1 lock, as indicated at 204, to prevent other automation tooling from interleaving. One of the first steps performed by the first tool's workflows is to shift traffic away from the device to transition the device into maintenance-mode, as indicated at 206. For example, the first tool may trigger another tool (e.g., other than the first and second tools shown in FIG. 2) to perform a shift operation. That shift operation may utilize an L2 lock, which is acquired before starting the shift operation and released after completing the shift operation.

In some examples, operations performed during the workflow may cause errors or other conditions detectable by the second tool. For example, if an interface starts experiencing errors, an alert is triggered to a second tool, as indicated at 208. This alert, in turn, kicks-off another workflow to shut-down that specific interface using the second tool. In this example schedule, the second tool being an operational tool, succeeds in acquiring an L2 lock before invoking the other workflow, as indicated at 210. After acquiring the L2 lock, the second tool begins the workflow by shutting down the problematic interface that triggered the alert, as indicated at 212. The acquisition of the L2 lock by the second tool and/or the performance of the shut down operation at 212 causes a network locking service to set a dirty/interleaved signal and/or otherwise mark the L1 lock as dirty. At 214, the first tool attempts to acquire an L2 lock in order to transition the state of the device to a maintenance-mode. However, the acquisition of the L2 lock by the second tool (and the associated dirty/interleaved signal) prevents the first tool from transitioning the device into maintenance-mode as the first tool fails to upgrade to L2 lock to perform that transition (due to the reservation of the L2 lock by the second tool), as indicated at 216. The first tool may be informed of the presence of the dirty/interleaved signal (e.g., as a reason for the denial of the L2 lock).

When the second tool is done remediating, the L2 lock is released, as indicated at 218, and the first tool is able to proceed with the L2 lock upgrade and clear the dirty/interleaved signal, as indicated at 220. In some examples, the first tool is informed of the L2 lock release (e.g., via the network locking service 106 and/or the device access service 108) once the second tool releases it, in order to allow the first tool to attempt to acquire its own L2 lock as soon as possible. In other examples, the first tool performs periodic checks and/or polls (e.g., requests for an L2 lock and/or a check for a dirty/interleaved signal, as described in more detail below) to determine when the L2 lock is released by the second tool. In some of the above-described examples, while (or instead of) waiting/polling for the lock to be released by the second tool, the first tool may perform ongoing monitoring of the system and/or may initiate a process for rolling back operations performed thus far in the workflow (e.g., reverting the traffic shift) to revert the device to a prior state. In examples where the first tool continues waiting for the L2 lock to be released by the second tool in order to continue the workflow triggered at 202, once the L2 lock is acquired by the first tool, the first tool holds the L2 lock until the device update is completed (e.g., after the state transition is performed and the upgrade is carried out, as indicated at 222) and traffic is shifted back to the device, as indicated at 224. No other tool is able to work on the device during the period the first tool workflow holds the L2 lock; this period may be called "the maintenance zone." Once traffic is shifted back, the first tool downgrades to L1 lock (e.g., releasing the L2 lock at 226) allowing remediation tools to operate on the device if there are events originating from that device. Upon completion of all workflows relating to the upgrade, the first tool releases the L1 lock, as indicated at 228.

Anytime tools are allowed to interleave one another in writing to the device via the L2 lock (e.g., one tool is allowed to perform device operations, such as device write operations, by holding an L2 lock while another tool holds an L1 lock), it creates a potential safety risk. When an operational tool over-rides an automation tool workflow, such as a device OS or config update, the configuration on the device is modified. In order to maintain safety and security in the system, an automation tool must preserve the modified config when it updates the device with its own configuration, to prevent incidents. In some cases, human intervention may be invoked via an alarm or notification system. Automation tools are notified of these interruptions to enable them to take corrective action. To support this, L1 lock is marked dirty/interleaved anytime the L2 lock overrides it. For example, in the above-described scenario of FIG. 2, the L1 lock acquired by the first tool may be marked dirty/interleaved when the L2 lock is acquired by the second tool at 210. Automation tool workflow uses this indication to assess device-state. This may include checking for alerts from a notification system (e.g., a quality or processing problem notification system) or refreshing a configuration for a corresponding device(s) and/or a configuration to be applied to a corresponding device(s) to the latest rendered configuration before proceeding. The workflow may also choose to abort altogether and retry later. Besides synchronizing device access between operational and automation tools, this approach now allows them to detect interventions and respond to them gracefully. A dirty/interleaved indicator in the L1 lock also enables automation tools to hold the L2 lock for very short durations and only as needed. Long critical sections (e.g., exceeding 40+ minutes) in use today can now be broken down into multiple short ones not exceeding 5 minutes. This allows operational and automation tools to interleave each other in the critical sections without blocking either, something that is not possible with other locking mechanisms. In the disclosed approaches, Service Level Agreements (SLAs) may be enforced on L1 and L2 lock durations.

Device reads may take the form of fetching operational statistics, device information, configuration, and/or simply fetching files from the device. While it is helpful to synchronize the writes, it is often less significant to synchronize simultaneous reads or reads and writes. The described locking mechanisms and associated systems and methods have the ability to statically classify device operations into reads, writes, impactful-reads, etc., enabling different synchronization policies to be applied. This safety risk may thus be addressed by subjecting critical-read operations to a mutual exclusion policy using the described multi-level locking mechanism. Further, to keep the locking system extensible, read locks may be held every time a read operation is performed. This allows the system to perform safety assertions or impose additional constraints in the future. In some examples, read operations may be permitted while writes are in progress but are subject to locking policy.

In performing device operations today, the scope of mutual exclusion is often limited to a single device. However, there are use cases where device scope is too broad or narrow. For example, in a border network, specific links are shifted without rebooting devices. Interface flapping (e.g., shut/un-shut) is another common scenario that is encountered. These scenarios call for a granularity that is much finer than the entire device, since operations performed in light of these scenarios may target different portions of the device. Such use cases can be supported by the disclosed locking mechanism by offering fine grain locks with scope limited to interfaces (e.g., the locks may be used to control access to individual interfaces of a device in the same manner that is described herein with reference to controlling access to a device as a whole). The disclosed locking service can synchronize the two scopes to ensure the device and interface locks function as expected. Going the other direction, the scope of workflows can span groups of devices or specific tiers in the groups and a much coarser lock can be synthesized to support such use cases while ensuring correctness (e.g., the locks may be used to control access to specified groups or tiers of devices in the same manner that is described herein with reference to controlling access to a single device). The disclosed locking system thus is extensible to support future use cases. The disclosed locking systems and methods may also include mechanisms for determining and indicating efficacy of the system through metrics, including data on lock usage. For example, data such as a number(s) and/or type(s) of locks that are acquired, released, and/or held, a number of locks marked dirty/interleaved, a number of safety assertions failed preventing device write operations, etc. may be tracked and stored and reported (e.g., via output to a dashboard or other user interface). Additional examples of reporting metrics include indicating a number of tickets and/or other service requests/indications of errors are encountered related to device write synchronization in systems utilizing the disclosed locking mechanisms.

Figure 3A:
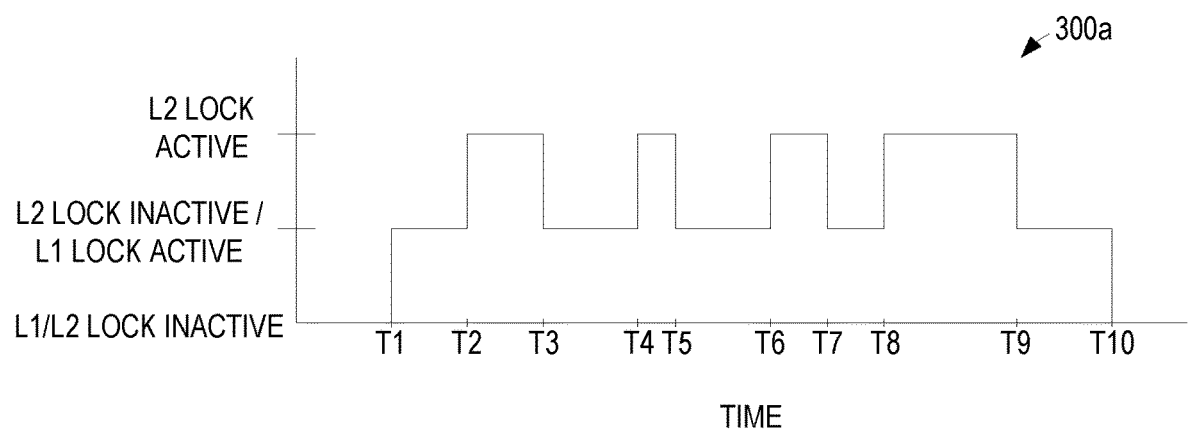
FIGS. 3A and 3B show graphical representations of example scenarios of issuing locks over time in accordance with examples of the present disclosure.
Figure 3B:
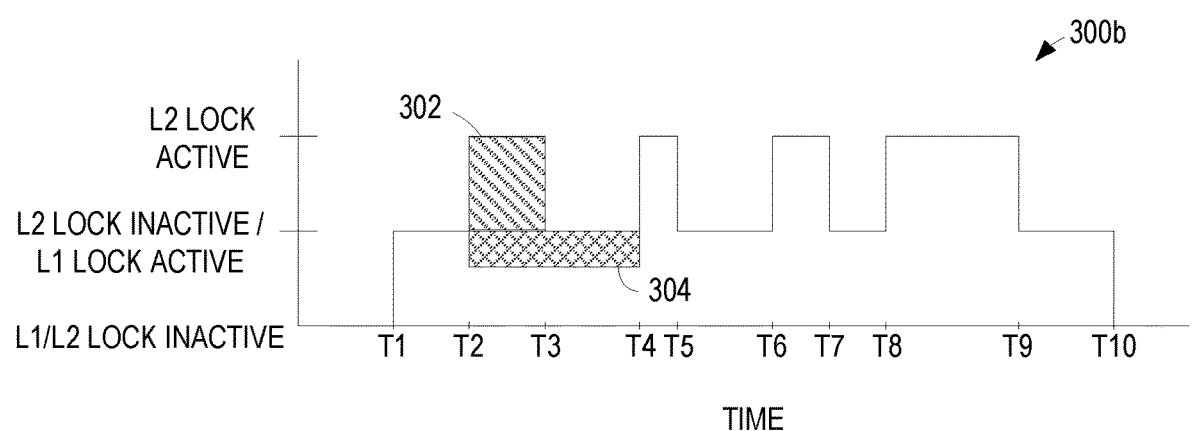

FIGS. 3A and 3B show example time diagrams 300a and 300b representing the acquisition of L1 and L2 locks in an example operating scenario for a network utilizing the disclosed locking mechanism technologies. For example, the diagrams 300a and 300b may represent locking activities implemented using the system 100 of FIG. 1.

In diagram 300a, an L1 lock is acquired by a deployment tool at time T1 and held until time T10 for performing a workflow relating to a deployment operation (e.g., a device/configuration upgrade operation [e.g., firmware/OS/software update, an interface change, etc.], an operation to deploy new features, an operation to change features for regulation compliance, etc.). During the course of the holding of the L1 lock, the deployment tool may also acquire several L2 locks for performing operational actions relating to the workflow. For example, a first L2 lock may be held from time T2 to time T3, a second L2 lock may be held from time T4 to T5, etc.

In diagram 300b of FIG. 3B, an interference that triggers a dirty/interleaved signal to be generated is illustrated. The diagram 300b may represent the same lock acquisition scenario shown in FIG. 3A, with the exception that a different (e.g., automation/operational) tool (e.g., different from the tool that acquired the L1 lock) acquires an L2 lock for the time period from T2 to T3, as indicated at 302. In response, a dirty/interleaved signal 304 may be active from time T2 to time T4, as the acquisition of the L2 lock by the original, deployment tool at time T4 may enable the deployment tool to clear the dirty/interleaved signal 304 and/or otherwise take action in response to the dirty/interleaved signal. For example, as described above, the deployment tool may use this dirty/interleaved signal indication to assess device-state, including checking for alerts from a notification system (e.g., a quality or processing problem notification system) or refreshing a configuration for a corresponding device(s) and/or a configuration to be applied to a corresponding device(s) to the latest rendered configuration before proceeding. In alternative examples, the workflow may also choose to abort altogether and retry later (e.g., the deployment tool may instead release the L1 lock after time T2 and then reacquire and restart the workflow once the L2 lock has been released by the operational tool).

Figure 4:
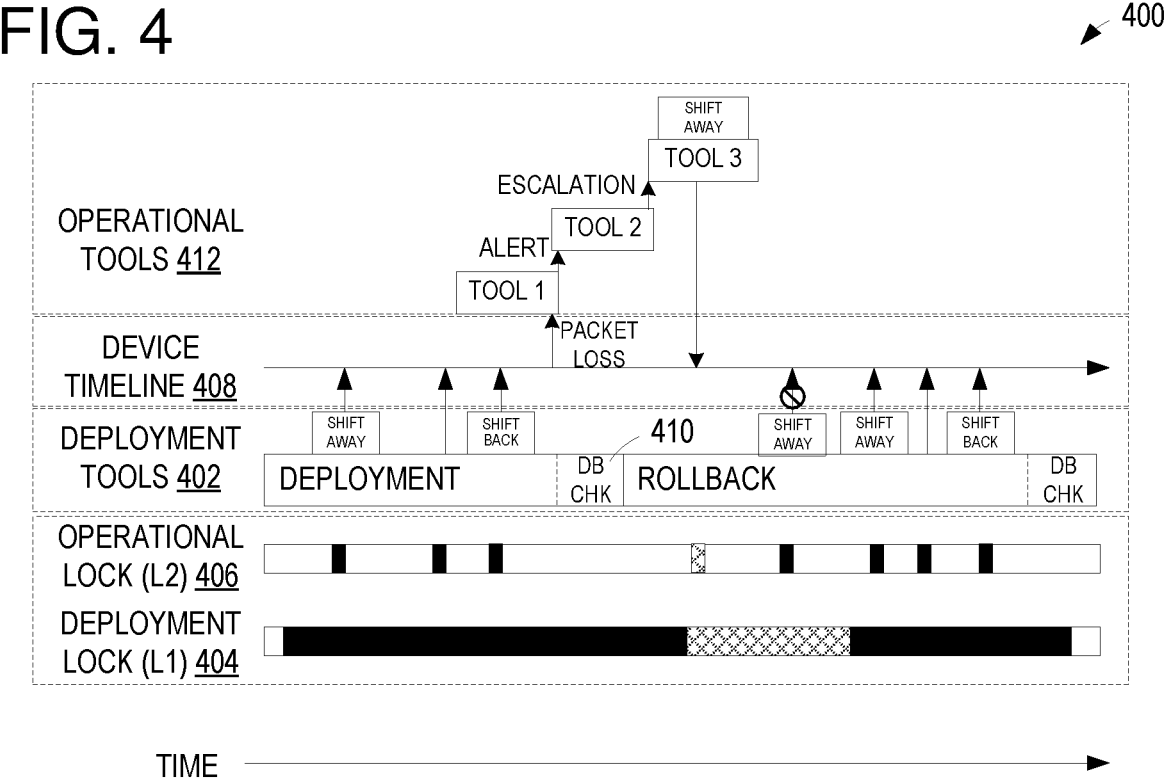
FIG. 4 shows a detailed graphical representation of an example scenario of managing operations of different tools using different levels of locks in which an operational tool interleaves a lock of a deployment tool.

FIG. 4 shows an example detailed graphical representation 400 of the scenario generally depicted in FIG. 3A (e.g., in which interference from another tool causes generation of a dirty/interleaved signal. In the representation of FIG. 4, a deployment tool 402 begins a deployment workflow (e.g., performing a device read/write operation on a network device) by acquiring a deployment (L1) lock 404 and performing deployment operations. For each deployment operation, an operational (L2) lock 406 is acquired. For example, as shown by the device timeline 408, the deployment operations may include shifting traffic away, transitioning a state of the device (e.g., to a maintenance mode), and shifting traffic back to the device, each operation having a corresponding L2 lock associated therewith to lock the device while the operation is performed.

As shown at 410, a dashboard check is performed to determine metrics of the device performance after the deployment. In the illustrated example, the check indicates that packet loss has occurred/is occurring, as detected by an operational tool 412 (Tool 1). Tool 1, in response, propagates an alert to a second operational tool (Tool 2), which escalates the issue to a third operational tool (Tool 3) to mitigate the issue. For example, the third tool may include human intervention to perform an operation, such as triggering a shift of traffic away from the device. This shift in traffic, being implemented by the operational tool, Tool 3, is performed by acquiring an L2 lock by the Tool 3 and then performing the shift operation. Since the L2 lock acquisition is an intervening lock acquisition (e.g., not made by the tool that acquired the L1 lock), the L1 lock is marked dirty/interleaved starting from the time the L2 lock was acquired, as represented by the hashed pattern in the deployment lock 404 timeline.

In the meantime, the deployment tool begins a rollback deployment operation as part of the workflow covered by the L1 lock. As part of the rollback, the deployment tool attempts to shift away traffic by attempting to acquire an L2 lock for the shift operation. However, since the L1 lock is still marked dirty/interleaved, the shift operation is not allowed to occur until the deployment tool addresses (e.g., clears) the dirty/interleaved signal. Once the dirty/interleaved signal is cleared, the deployment tool retries the shift away operation, then completes the workflow by transitioning the state of the device/performing the rollback, and shifting the traffic back to the device (where an L2 lock is acquired for the deployment tool for each of these operations).

Figure 5:
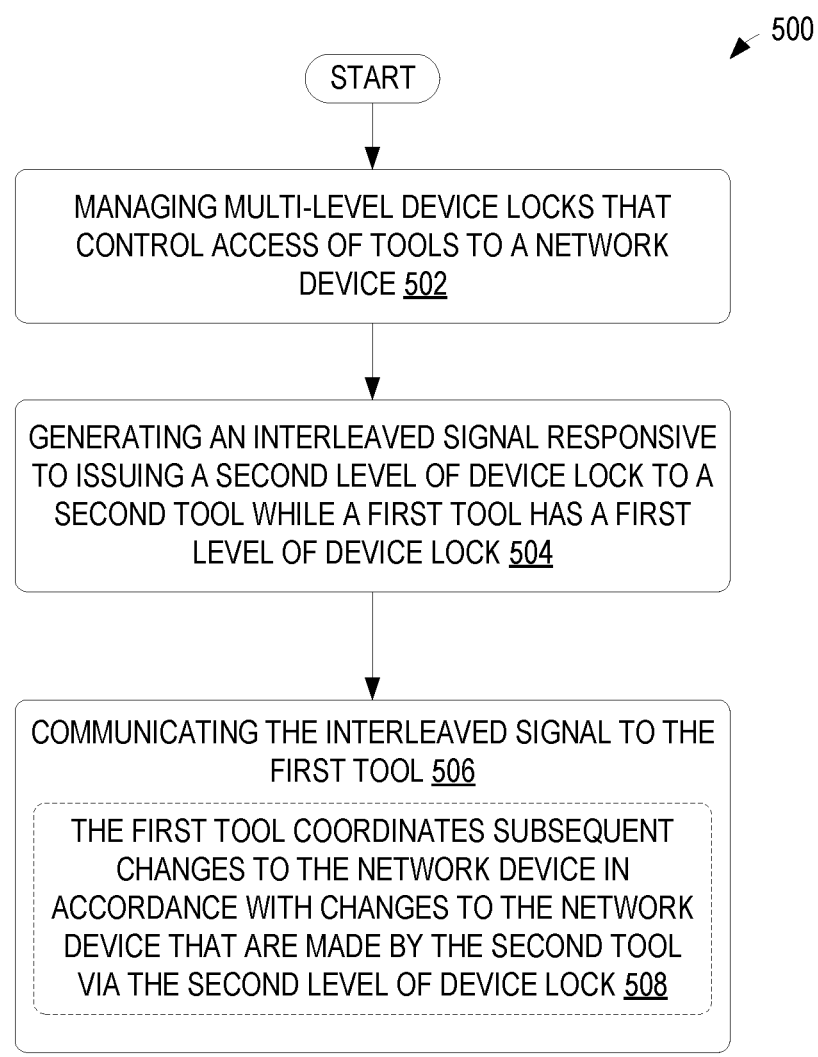
FIG. 5 is a flow chart of an example method of controlling access to a network device in accordance with a multi-level locking construct to coordinate operations of different tools.

FIG. 5 is an example method 500 for providing a locking mechanism in accordance with the technologies described herein. For example, method 500 may be performed by the device access service 108 and the network locking service 106 in coordination with the tools 102 to control access to network devices included in the network infrastructure 104 of FIG. 1. At 502, the method includes managing multi-level device locks that control access of tools to a network device. For example, the device locks may include a first level of device lock associated with a first priority and a second level of device lock associated with a second priority, where the first priority is lower than the second priority.

At 504, the method includes generating an interleaved signal responsive to issuing a second level of device lock to a second tool while a first tool has a first level of device lock active. For example, a first tool may include a deployment tool that has a first level of device lock (e.g., an L1 lock) for performing a deployment workflow. During the workflow, a higher priority operation may be performed by a different tool, which is granted the second level of lock (e.g., an L2 lock) to allow the tool to perform urgent tasks.

At 506, the method includes communicating the interleaved signal to the first tool. For example, the communication may include an active communication (e.g., the network locking service may actively transmit an indication of the interleaved signal to the first tool) or the communication may include a passive communication (e.g., the first tool may poll or query to receive an indication of the status of the interleaved signal). As indicated at 508, the first tool coordinates subsequent changes to the network device, based on the interleaved signal, in accordance with the changes to the network device that are made by the second tool while the second level of device lock is active for the second tool. In this way, the higher priority operations can still be completed without creating interference issues with the lower priority operations of the first tool, since the first tool can accommodate for the higher priority operations (e.g., by reverting back to a prior state and repeating operations in light of/while sustaining [e.g., not altering] the changes to the network device made by the second tool, etc.).

Figure 6:
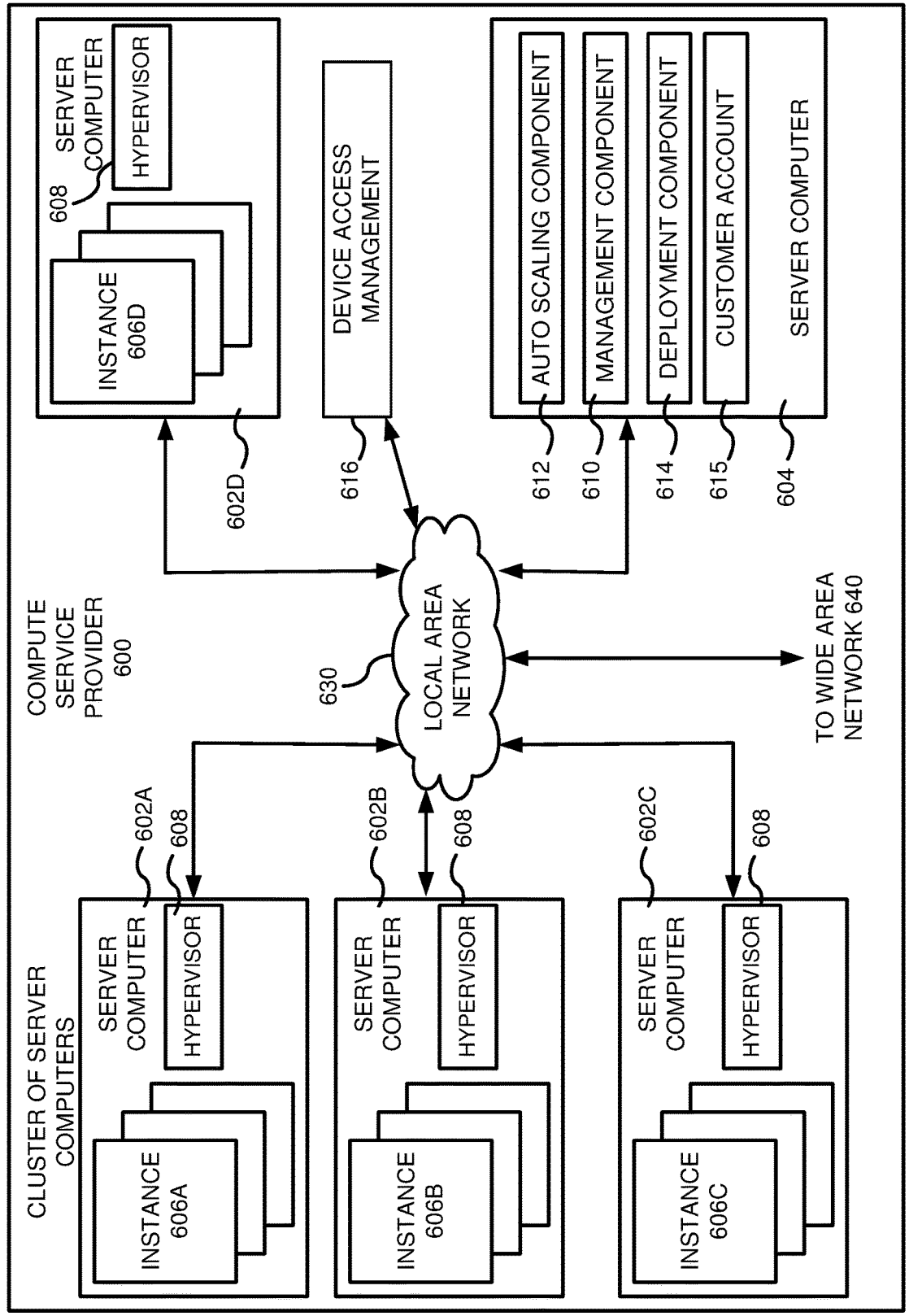
FIG. 6 is an example system diagram showing a plurality of virtual machine instances running in the multi-tenant environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. In some examples, the server computer may include components for managing and/or interfacing with the locking technologies described herein. In such examples, the components of the server computer may include tools (e.g., corresponding to tools 102 of FIG. 1) that access devices in the network (e.g., the other server computers 602A-602B and/or routers or other network devices in the local area network 630 and/or wide area network 640). For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

Device access management 616 may include components for implementing the locking technologies described herein, such as the device access service 108, operation authorization service 110, and/or network locking service 106 of FIG. 1. For example, device access management may manage multi-level locks to control access of tools in the server computer 604 and/or other components to devices in the network (e.g., the local area network 630, the wide area network 640, and/or other devices in the compute service provider 600) in accordance with the methods and systems described herein.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

Figure 7:
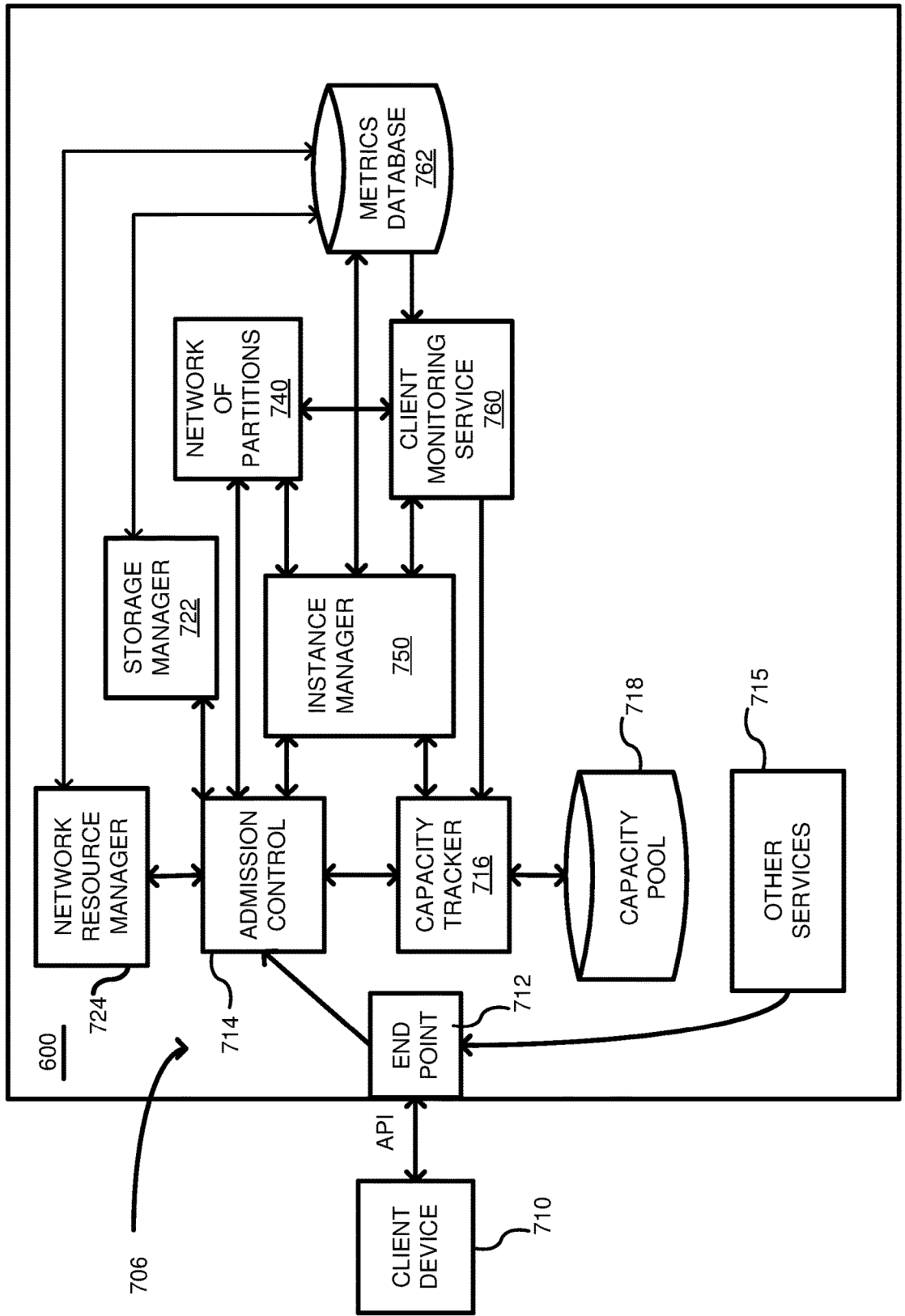
FIG. 7 shows further details of an example system including a plurality of management components associated with a control plane.

FIG. 7 illustrates in further detail management components 706 that can be used in the multi-tenant environment of the compute service provider 600. In order to access and utilize instances (such as instances 606 of FIG. 6), a client device can be used. The client device 710 can be any of a variety of computing devices, mobile or otherwise including a cell phone, smartphone, handheld computer, Personal Digital Assistant (PDA), desktop computer, etc. The client device 710 can communicate with the compute service provider 600 through an end point 712, which can be a DNS address designed to receive and process API requests. In particular, the end point 712 can be a web server configured to expose an API. Using the API requests, a client 710 can make requests to implement any of the functionality described herein. Other services 715, which can be internal to the compute service provider 600, can likewise make API requests to the end point 712.

Other general management services that may or may not be included in the compute service provider 600 include an admission control 714, e.g., one or more computers operating together as an admission control service. The admission control 714 can authenticate, validate and unpack the API requests for service or storage of data within the compute service provider 600. The capacity tracker 716 is responsible for determining how the servers need to be configured in order to meet the need for the different instance types by managing and configuring physical inventory in terms of forecasting, provisioning and real-time configuration and allocation of capacity. The capacity tracker 716 maintains a pool of available inventory in a capacity pool database 718. The capacity tracker 716 can also monitor capacity levels so as to know whether resources are readily available or limited. An instance manager 750 controls launching and termination of instances in the network. When an instruction is received (such as through an API request) to launch an instance, the instance manager pulls resources from the capacity pool 718 and launches the instance on a decided upon host server computer. Similar to the instance manager are the storage manager 722 and the network resource manager 724. The storage manager 722 relates to initiation and termination of storage volumes, while the network resource manager 724 relates to initiation and termination of routers, switches, subnets, etc. A network of partitions 740 is described further in relation to FIG. 8 and includes a physical layer upon which the instances are launched.

A client monitoring service 760 can provide monitoring for resources and the applications customers run on the compute service provider 600. System administrators can use the monitoring service 760 to collect and track metrics, and gain insight to how applications are running. For example, the monitoring service 760 can allow system-wide visibility into application performance and operational health. Metrics generated by the client monitoring service 760 can be stored in the metrics database 762.

Figure 8:
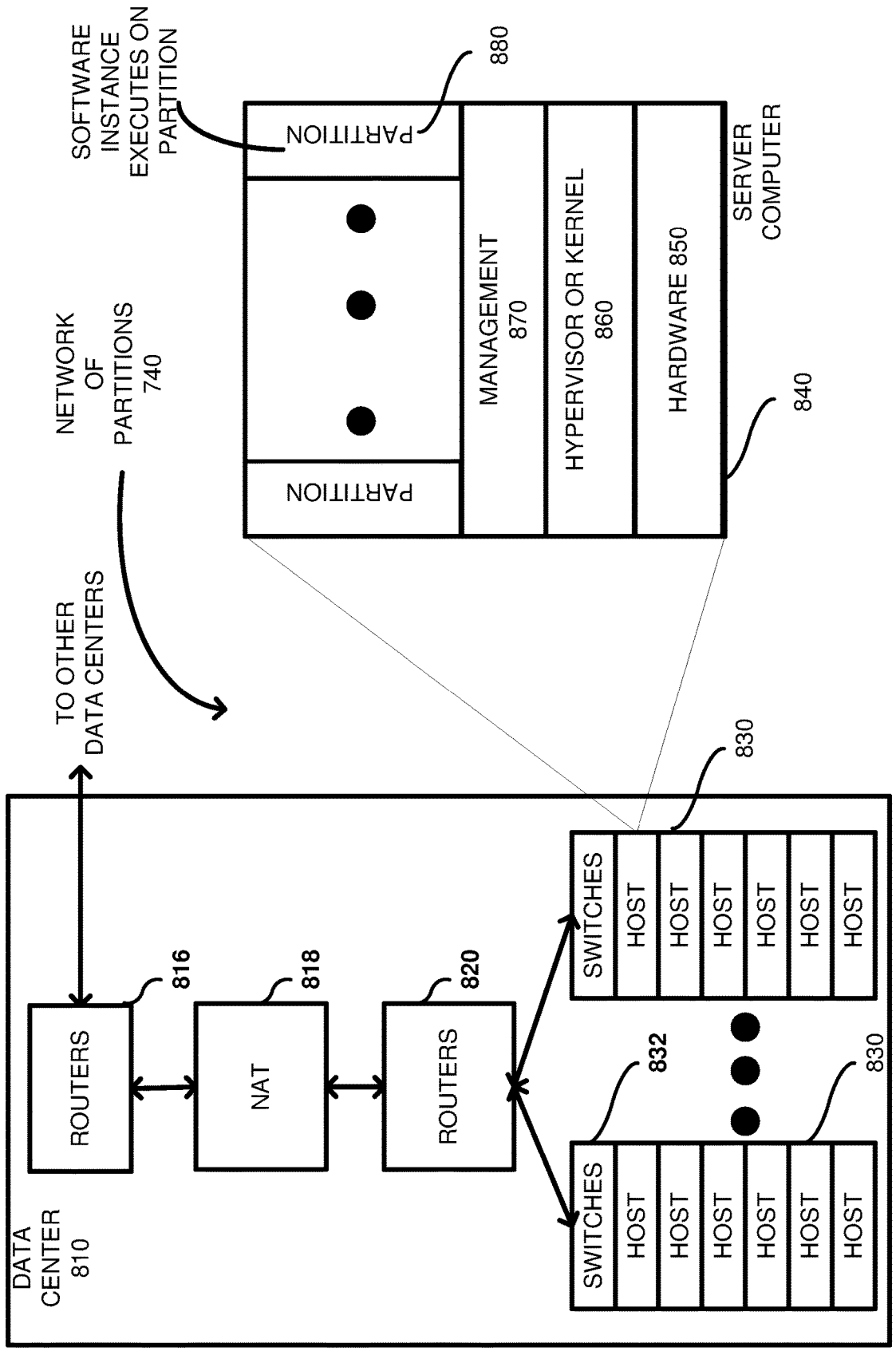
FIG. 8 shows an example of a plurality of host computers, routers and switches, which are hardware assets used for running virtual machine instances.

FIG. 8 illustrates the network of partitions 740 and the physical hardware associated therewith. The network of partitions 740 can include a plurality of data centers, such as data center 810, coupled together by routers 816. The routers 816 read address information in a received packet and determine the packet's destination. If the router decides that a different data center contains a host server computer, then the packet is forwarded to that data center. If the packet is addressed to a host in the data center 810, then it is passed to a network address translator (NAT) 818 that converts the packet's public IP address to a private IP address. The NAT also translates private addresses to public addresses that are bound outside of the datacenter 810. Additional routers 820 can be coupled to the NAT to route packets to one or more racks of host server computers 830. Each rack 830 can include a switch 832 coupled to multiple host server computers. A particular host server computer is shown in an expanded view at 840.

Each host 840 has underlying hardware 850 including one or more CPUs, memory, storage devices, etc. Running a layer above the hardware 850 is a hypervisor or kernel layer 860. The hypervisor or kernel layer can be classified as a type 1 or type 2 hypervisor. A type 1 hypervisor runs directly on the host hardware 850 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 870 can be part of the hypervisor or separated therefrom and generally includes device drivers needed for accessing the hardware 850. The partitions 880 are logical units of isolation by the hypervisor. Each partition 880 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions. In some examples, the operations (e.g., read/write operations) for which locks are acquired as described herein may be performed on routers such as the routers 816, 820, etc. and the tools may reside on one or more of the partitions 880.

Any applications executing on the instances can be monitored using the management layer 870, which can then pass the metrics to the client monitoring service 760 for storage in the metrics database 762. Additionally, the management layer 870 can pass to the monitoring service 750 the number of instances that are running, when they were launched, the operating system being used, the applications being run, etc. All such metrics can be used for consumption by the health monitoring service 760 and stored in database 762.

Figure 9:
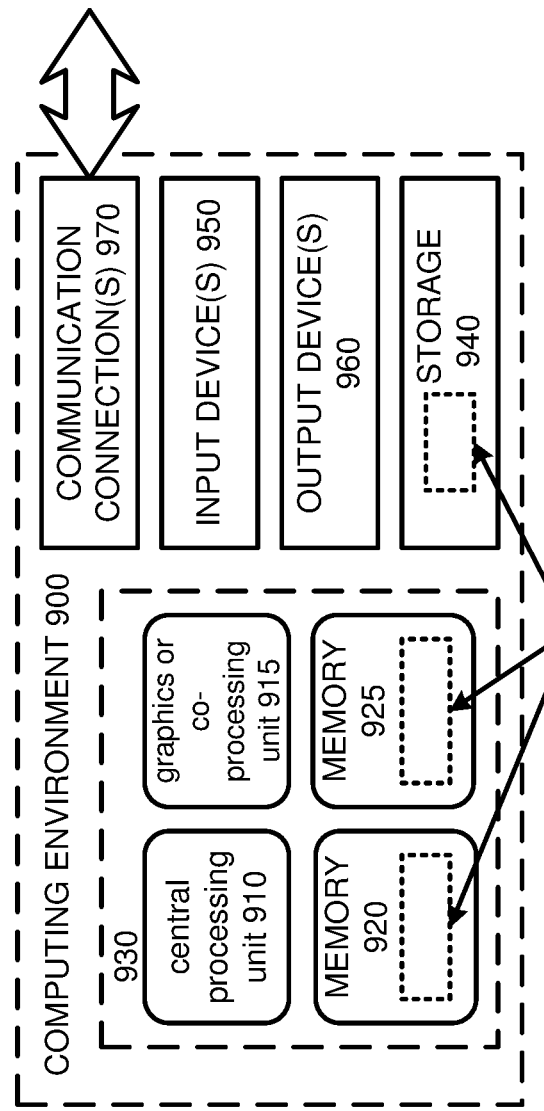
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system comprising:
one or more computing systems including one or more processors configured to execute instructions for one or more services stored on one or more storage devices, the one or more services including:
a device access service connected between a plurality of tools and a network device, the device access service comprising first computer-executable instructions to interface the plurality of tools with the network device and to enforce policies relating to access for altering the network device based on device locks; and
a network locking service comprising second computer-executable instructions to manage the device locks, the device locks including a first-level device lock associated with a first priority and a second-level device lock associated with a second priority that is higher than the first priority, wherein the network locking service further comprises third computer-executable instructions to:
issue the first-level device lock to a first tool of the plurality of tools for a first workflow;
while the first-level device lock is active, issue the second-level device lock to a second tool of the plurality of tools for a high priority operation to allow the second-level device lock to be active while the first-level device lock is active;
generate an interleaved signal responsive to issuing the second-level device lock to the second tool while the first-level device lock is active, wherein the interleaved signal indicates that the second tool is allowed to interleave commands with commands of the first tool by initiating or performing device operations while the first-level device lock is active, and wherein the first tool queries a status of the interleaved signal and coordinates subsequent alterations to the network device in accordance with alterations to the network device made by the second tool via the high priority operation based on the status of the interleaved signal.

2. The system of claim 1, further comprising an operation authorization service comprising fourth computer-executable instructions to check that an operation requested to be performed by one of the plurality of tools is authorized.

3. The system of claim 1, wherein the device access service includes a plurality of Application Programming Interfaces (APIs), wherein the plurality of tools are configured to invoke a selected API of the plurality of APIs to alter the network device, and wherein the first computer-executable instructions validate access to the network device using the network locking service responsive to the invocation of the selected API.

4. The system of claim 1, wherein the network device is in a cloud computing network.

5. The system of claim 1, further comprising an operational state monitor comprising fifth computer-executable instructions to update an operational state of the network device responsive to alterations to the network device performed by the plurality of tools.

6. A method of managing a network device, the method comprising:
managing device locks configured to control access of a plurality of tools to memory or storage of the network device, the device locks including a first level of device lock associated with a first priority and a second level of device lock associated with a second priority that is higher than the first priority; and
generating a signal responsive to issuing the second level of device lock to a second tool while a first tool has an active first level of device lock to allow the second tool to initiate or perform operations while the first tool holds the first level of device lock, wherein an indication of the signal causes the first tool to coordinate subsequent changes to the memory or storage of the network device in accordance with changes to the memory or storage of the network device that are made by the second tool after the signal is generated and while the first tool has the active first level of device lock.

7. The method of claim 6, further comprising allowing the first tool to access the network device responsive to a request from the first tool to perform a device operation.

8. The method of claim 7, wherein the request is received as an invocation of an Application Programming Interface (API) associated with a device operation.

9. The method of claim 7, further comprising, responsive to the request from the first tool, validating device access for performing the device operation with the first tool, wherein validating device access for the first tool includes confirming with a network locking service that the first tool has been issued a valid lock for performing the device operation, and wherein the valid lock comprises the first level of device lock when the device operation is associated with the first priority and the second level of device lock when the device operation is associated with the second priority.

10. The method of claim 7, further comprising, responsive to the request from the first tool, validating device access for performing the device operation with the first tool, wherein validating device access for the first tool includes confirming with an operation authorization service that the device operation is authorized for the first tool.

11. The method of claim 7, further comprising updating operational state data for the network device in an operational state monitor based on the performance of the device operation.

12. The method of claim 6, wherein the device locks further include a third level of device lock associated with a third priority that is lower than the first priority and the second priority.

13. The method of claim 6, further comprising receiving, at a network locking service, a request from the first tool to acquire the second level of device lock while the second tool has the second level of device lock, and wherein the indication of the signal is provided to the first tool responsive to the request from the first tool to acquire the second level of device lock.

14. The method of claim 6, wherein coordinating the subsequent changes to the network device with the first tool in accordance with the changes to the network device that are made by the second tool after the signal is generated comprises performing a corrective action corresponding to prior changes to the network device made by the first tool while the first level of device lock is active.

15. The method of claim 6, wherein coordinating the subsequent changes to the network device with the first tool in accordance with the changes to the network device that are made by the second tool after the signal is generated comprises reverting changes made by the first tool prior to the issuance of the second level of device lock to the second tool while sustaining changes from the second tool made while the second tool holds the second level of device lock responsive to receiving the indication of the signal.

16. The method of claim 6, further comprising releasing the second level of device lock from the second tool after completing the changes to the network device that are made by the second tool after the signal is generated, and subsequently issuing the second level of device lock to the first tool.

17. One or more non-transitory computer-readable storage media comprising computer-executable instructions that, when executed, cause a computing system to perform a method comprising:
receiving a trigger to start a workflow for altering a network device;
acquiring a first device lock for the network device to perform the workflow, the first device lock having a first level of priority and controlling one or more of read or write access to memory or storage of the network device;

requesting a second device lock for the network device to perform a device operation, the second device lock having a second level of priority that is higher than the first level of priority and controlling one or more of read or write access to the memory or storage of the network device;

receiving a status of an interleaved signal and determining that the first device lock is marked as interleaved due to acquisition of a third device lock having the second level of priority by a different network tool and controlling one or more of read or write access to the memory or storage of the network device while the first device lock is still active;

resubmitting the request for the second device lock after the third device lock is released;

responsive to acquiring the second device lock, performing the device operation in coordination with changes to the device made by the different network tool using the third device lock based on the status of the interleaved signal; and releasing the first and second device locks once the workflow is complete or terminated.

18. The one or more non-transitory computer-readable storage media according to claim 17, wherein the acquisition of the first and second device locks is performed via respective lock requests made to a network locking service, and wherein the performance of the device operation is executed by requesting a device access service for permission to access the memory or storage of the network device.

19. The one or more non-transitory computer-readable storage media according to claim 18, wherein the device access service grants the permission to access the memory or storage of the network device based on performance of a validation of an associated device lock with the network locking service.

20. The one or more non-transitory computer-readable storage media according to claim 17, wherein the computer-executable instructions, when executed, further cause the computing system to clear an interleaved marking of the first device lock responsive to acquiring the second device lock.

\* \* \* \* \*